C. L. WRIGHT, M. L. SMART, C. M. HOPPER & G. W. THOMPSON.
AUTOMATIC REGISTER FOR TANKS.
APPLICATION FILED NOV. 13, 1913.
1,142,926. Patented June 15, 1915.
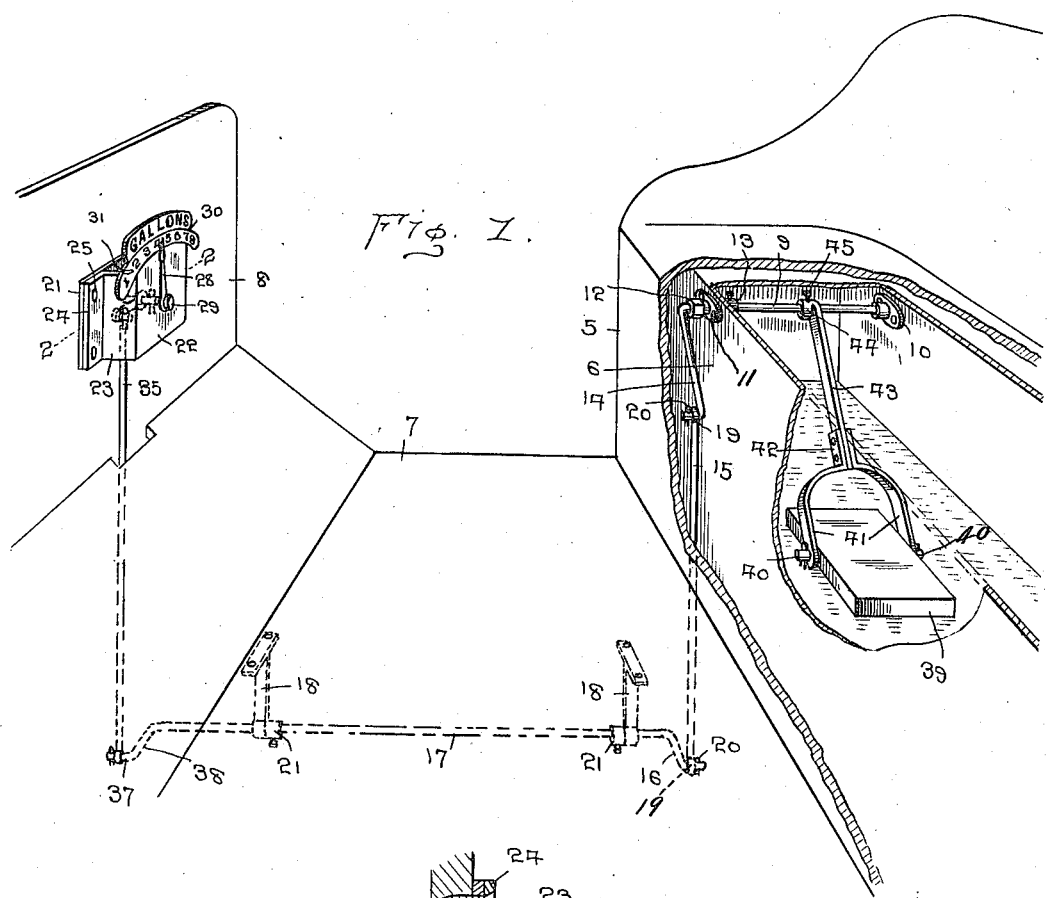
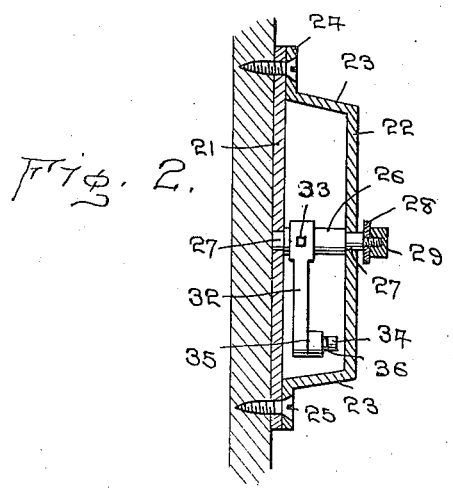

UNITED STATES PATENT OFFICE.

CHESTER L. WRIGHT, MASON L. SMART, CALVIN M. HOPPER, AND GEORGE W. THOMPSON, OF SUMNER, MISSOURI.

AUTOMATIC REGISTER FOR TANKS.

1,142,926.  Specification of Letters Patent.  Patented June 15, 1915.

Application filed November 13, 1913. Serial No. 800,845.

*To all whom it may concern:*

Be it known that we, CHESTER L. WRIGHT, MASON L. SMART, CALVIN M. HOPPER, and GEORGE W. THOMPSON, citizens of the United States, residing at Sumner, in the county of Chariton and State of Missouri, have invented certain new and useful Improvements in Automatic Registers for Tanks; and we do hereby declare the following to be a full, clear, and exact description of the invention, such as will enable others skilled in the art to which it appertains to make and use the same.

This invention relates to registering devices, and more particularly to a device for registering the amount of gasolene in the tank of a motor vehicle.

The principal object of the invention is the provision of means for ascertaining at any time, the amount of gasolene in the tank, whether the vehicle be standing or running, on a grade or on a level.

Another object of the invention is the provision of a device of the class described, which contemplates the provision of a visible indicator on the dash board of a vehicle, connected with a float in the gasolene tank in such a way that there are no pipes leading from the tank, used in connection with the indicator, which would require cleaning and might spring leaks or cause other trouble.

A further object of the invention is the provision of a device of the class described, which will be simple, durable, efficient in operation, and inexpensive to manufacture.

With these and other objects in view which will become apparent as the description proceeds, the invention resides in the construction, combination, and arrangement of parts hereinafter more fully described and claimed and illustrated in the accompanying drawing, in which like characters of reference indicate like parts throughout the figures, of which, Figure 1 represents a perspective view of a portion of an automobile, parts being broken away, Fig. 2 represents a horizontal sectional view on the line 2—2 of Fig. 1.

Referring more particularly to the drawing, 5 indicates the front seat of an automobile under which the gasolene tank 6 is located, 7 indicates the floor, and 8 the dash board of an automobile. A shaft 9 extends across the gasolene tank to one side of the center thereof and has its inner end rotatably supported in a socket 10, secured to the rear wall of the tank, while the outer end of the shaft extends through the front wall of the tank and is supported in a flanged shaft bearing 11, which is threaded at its outer end to receive a stuffing cap 12, a collar 13 being secured by means of a set screw on shaft 9 adjacent the front wall of the tank for preventing longitudinal movement of said shaft. The outer end of shaft 9 is bent to form a crank arm 14, said arms being connected by means of a link 15 to the rear crank arm 16 of a rock shaft 17 which is rotatably supported in brackets 18 depending from the floor 7, the ends of link 15 being provided with eyes 19 to engage the outwardly bent ends of crank arms 14 and 16, said ends provided with cotter pins 20 for preventing loss of link 15. Collars 21 are secured by means of set screws on rock shaft 17 near opposing sides of brackets 18 for preventing longitudinal movement of said shaft.

On the dash board 8 is a casing which provides a rear wall 21 and a front wall 22, the ends 23 of which are bent at approximately right angles to wall 22 to space the front wall from the rear wall of the casing, and ends 23 are bent at right angles as at 24 to lie against rear wall 21, and are secured thereto by means of screws or other fastening means 25 which pass through the wall 21 into the dash board for securing the casing in place. A stub shaft 26 has its ends reduced as at 27, the rear end of said shaft extending into an opening in rear wall 21 of the casing and the front end of the shaft extending through an opening in the front wall 22 of the casing and being further reduced to receive a pointer 28, which is secured in place by means of a thumb nut 29 threaded on the extreme outer end of the stub shaft. Positioned on the top of the front wall of the casing is a substantially arcuate scale bar 30 provided with numerals 31 on the lower portion thereof in spaced relation, and which are adapted to co-act with the pointer 28 in determining the amount of gasolene in the tank, the upper portion of the scale bar having the word "gallons" painted or otherwise applied thereon. A crank arm 32 fits at one end over stub shaft 26 between the walls of the casing and is secured thereto by means of a set screw 33, the outer end of the crank arm being provided with a pin 34, over which fits one end of a second link 35 secured in place by means of a cotter pin 36, the lower end of link 35 fitting over the bent end 37 of a crank arm 38 formed on the forward end of rock shaft 17, said crank arm lying in the same plane and extending in the same direction with the crank arm 16 at the opposite end of said rock shaft. It will be seen by this construction, that rotary motion imparted to shaft 9 will be imparted to stub shaft 26 through the medium of link 15, rock shaft 17, link 35, and crank arm 32, thus actuating pointer 28 for bringing the same in registration with numerals 31 upon the scale bar 30 in one direction or the other, and in order to cause a rotation of shaft 9 as the gasolene in the tank rises or falls, a rectangular float 39 is provided, which is pivotally mounted by means of pins 40 extending in opposite directions centrally from the opposite edges of the float, through openings in the lower ends of curved arms 41, which arms are bent into parallel relation at their upper ends as at 42, and are secured to the lower end of a rod 43, through the upper end 44 of which shaft 9 extends, said rod being secured on shaft 9 by means of a set screw 45. The float is positioned centrally of the tank, and therefore rod 43 is disposed at an angle since shaft 9 is to one side of the center of said tank, and it is thus apparent that as float 39 rises or falls as the tank is being filled or emptied respectively, rotary motion will be imparted to shaft 9 and consequently the pointer 28 will be actuated as before stated, for indicating the amount of gasolene in the tank. By reason of the float 39 being in the center of the tank, it is evident that its position with relation to the tank will remain constant, whether the surface of the gasolene is parallel with the bottom of the tank or at an angle thereto, according to whether the automobile is on a level or on a grade, and it will thus be seen that correct registration of the amount of gasolene will always be given.

Although we have described the preferred embodiment of our invention, we reserve and may exercise the right to make such changes in the construction, combination, and arrangement of parts, as do not depart from the spirit of the invention and the scope of the appended claims.

Having thus described our invention what we claim as new and desire to secure by Letters-Patent is,

1. In a device of the class described, the combination with a tank arranged under the seat of a vehicle, of a transverse shaft journaled in one end of said tank and having one of its ends projecting through the forward wall thereof, an arm formed upon the projecting end of said shaft, brackets arranged upon the under side of the vehicle body, a horizontal rock shaft journaled in said brackets, an arm arranged upon the rear end of said rock shaft, a link connecting said first mentioned arm with said rear arm of said rock shaft, a forward arm arranged upon said rock shaft, a casing arranged upon the dash board of the vehicle, a stub shaft journaled in said casing and having one of its ends projecting through the rear wall of said casing, a scale bar arranged upon said casing, a pointer arranged upon the projecting end of said stub shaft and coacting with said scale bar, a rocker arm arranged upon said stub shaft within said casing, a second link connecting said rocker arm with the forward arm of the rock shaft, a rod secured to said shaft within said tank, a yoke consisting of oppositely curved arms secured to the free end of said rod, and a float pivotally mounted within the free ends of said yoke and centrally of said tank, whereby said pointer is actuated to accurately register the quantity of liquid by the rise and fall of the float within said tank.

2. In a device of the class described, the combination with an elongated rectangular tank positioned within the body of the vehicle, of oppositely disposed journals arranged in the upper edges of the forward and rear walls of said tank and adjacent one end thereof, a transversely disposed shaft mounted in said journals but having one of its ends projecting through the forward wall of said tank, an arm formed upon the projecting end of said shaft, brackets arranged upon the under side of the vehicle body, a horizontally disposed rock shaft journaled in said bracket, forward and rearward arms formed upon the respective ends of said rock shaft, said arms being in the same plane, a link connecting said first mentioned arm with the rear arm of said rock shaft, a casing arranged upon the dash board of the vehicle, a stub shaft journaled in the walls of said casing, and having one of its ends projecting through the rear wall of said casing, a scale bar arranged upon the rear wall of said casing, a pointer arranged upon the projecting end of the said shaft and coacting with said scale bar, a rocker arm adjustably secured to said stub shaft within said casing, a second link connecting said rocker arm with the forward arm of said rock shaft, a rod adjustably secured to said shaft within said tank, and positioned at a point intermediate of the ends thereof, a yoke arranged upon the free end of said rod, and a float pivotally mounted within said yoke, said float being centrally positioned within said tank, whereby said pointer is actuated by the rise and fall of the float for accurately registering the quantity of liquid within said tank irrespective of the inclinations of the tank.

In testimony whereof we have signed our names to this specification in the presence of two subscribing witnesses.

CHESTER L. WRIGHT.
MASON L. SMART.
CALVIN M. HOPPER.
GEORGE W. THOMPSON.

Witnesses:
D. T. SMART,
J. A. DONNIGAN.